United States Patent
Kadar-Kallen

(10) Patent No.: US 9,091,818 B2
(45) Date of Patent: Jul. 28, 2015

(54) FERRULE WITH ENCAPSULATED PROTRUDING FIBERS

(75) Inventor: Michael Aaron Kadar-Kallen, Harrisburg, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 768 days.

(21) Appl. No.: 13/326,852

(22) Filed: Dec. 15, 2011

(65) Prior Publication Data

US 2013/0156381 A1    Jun. 20, 2013

(51) Int. Cl.
  *G02B 6/36* (2006.01)
  *G02B 6/32* (2006.01)
  *G02B 6/38* (2006.01)

(52) U.S. Cl.
  CPC ............... *G02B 6/325* (2013.01); *G02B 6/382* (2013.01); *G02B 6/3861* (2013.01)

(58) Field of Classification Search
  None
  See application file for complete search history.

(56) References Cited

U.S. PATENT DOCUMENTS

| | | | |
|---|---|---|---|
| 5,028,112 A * | 7/1991 | Holmberg et al. | 385/58 |
| 5,107,627 A | 4/1992 | Mock, Jr. et al. | |
| 6,409,394 B1 * | 6/2002 | Ueda et al. | 385/80 |
| 7,377,700 B2 | 5/2008 | Manning et al. | |
| 2001/0036341 A1 | 11/2001 | Ohtsuka et al. | |
| 2002/0028037 A1 * | 3/2002 | Steinberg et al. | 385/20 |
| 2003/0142921 A1 | 7/2003 | Dallas et al. | |
| 2006/0245695 A1 | 11/2006 | Fujiwara et al. | |
| 2009/0271126 A1 | 10/2009 | Gurreri et al. | |
| 2012/0145307 A1 * | 6/2012 | Margolin et al. | 156/72 |

FOREIGN PATENT DOCUMENTS

CN    1060426 A    4/1992

OTHER PUBLICATIONS

Van Geffen et al.; Ferrule Assembly Process; U.S. Appl. No. 12/872,315, filed Aug. 31, 2010.
International Search Report, International Application No. PCT/US2012/069709, International Filing Date Dec. 14, 2012.
Chinese counterpart (2012800610317) Office Action and Search Report dated Apr. 3, 2015.

* cited by examiner

*Primary Examiner* — Hemang Sanghavi

(57) ABSTRACT

A process for preparing terminated fibers comprising: (a) deposition one or more fibers in a ferrule having a ferrule end face such that a portion of each fiber extends forward beyond the ferrule end face; (b) after step (a), positioning a register surface in a predetermined position relative to the ferrule end face; (c) after step (b), depositing an optically-clear filler between the end face and the register surface and around the portion of each fiber; and (d) once the filler solidifies, releasing the register surface form the filler to define a mating surface on the filler.

17 Claims, 2 Drawing Sheets

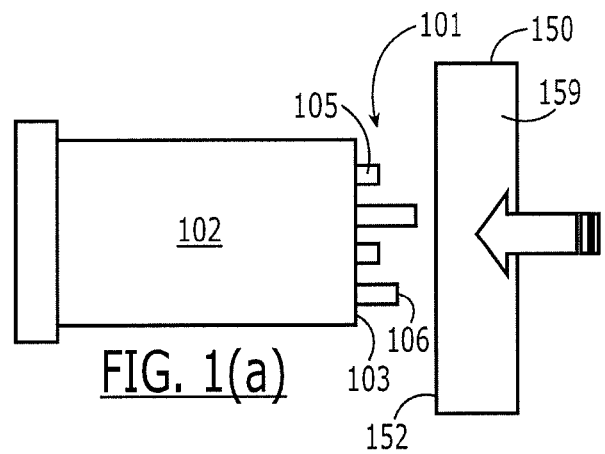
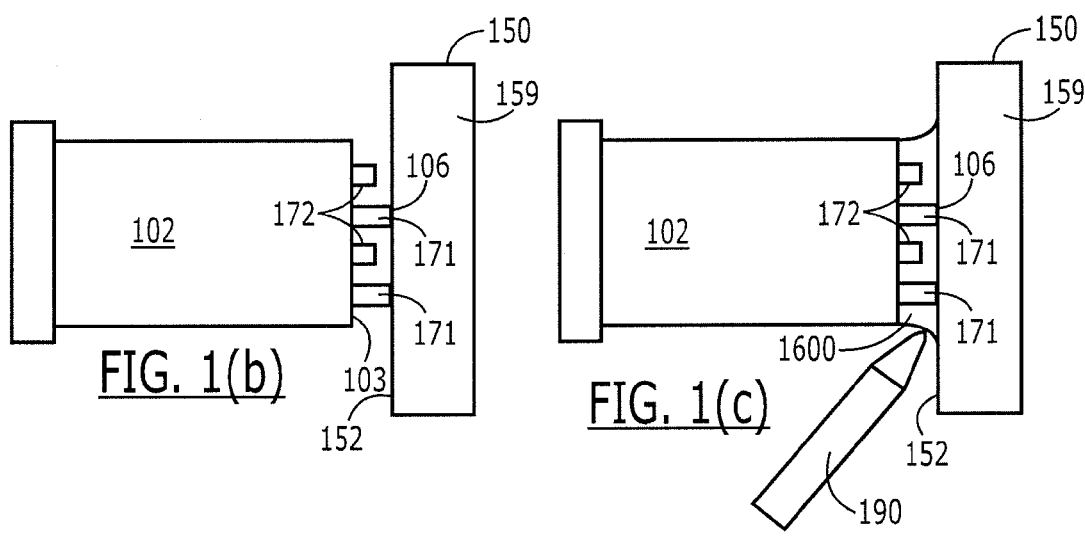
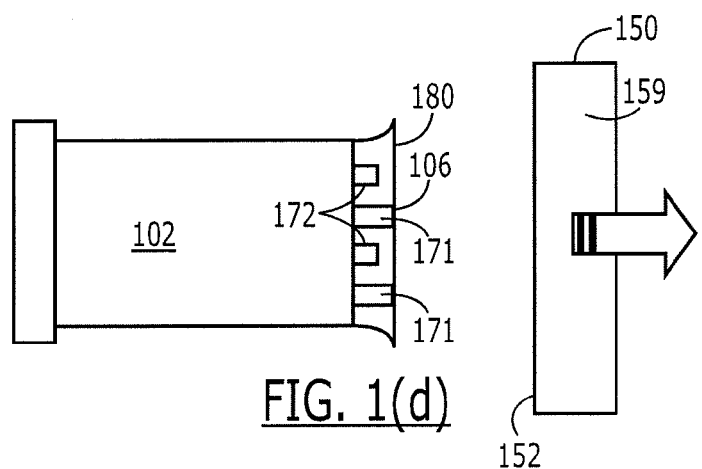

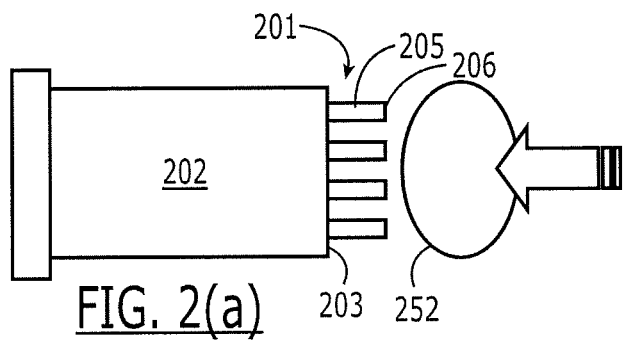
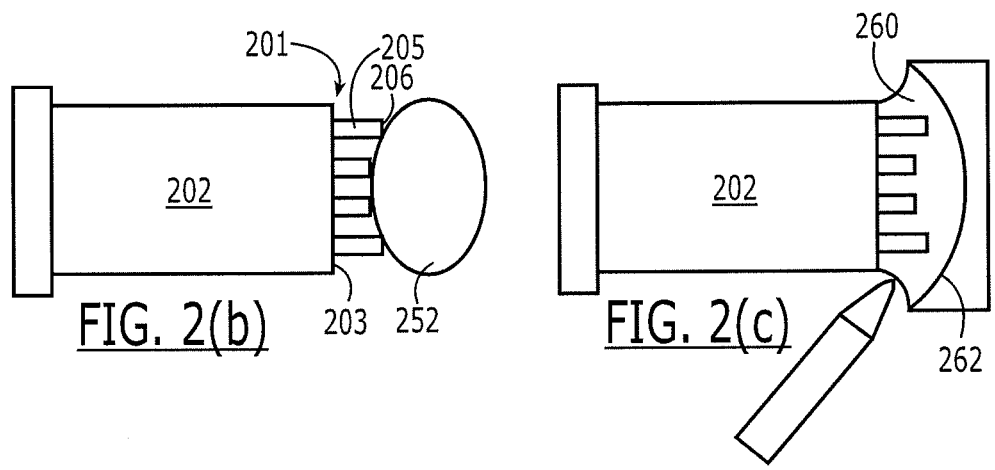
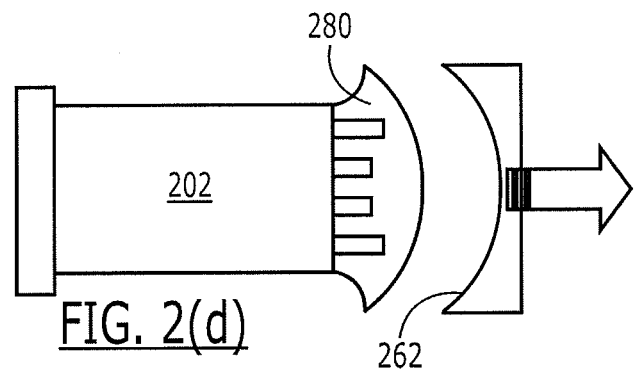

FERRULE WITH ENCAPSULATED PROTRUDING FIBERS

FIELD OF INVENTION

The present invention relates generally to a process for manufacturing a ferrule assembly, more specifically, to controlling fiber protrusion of a ferrule assembly.

BACKGROUND OF INVENTION

Optical fiber connectors are an essential part of substantially all optical fiber communication systems. For instance, optical connectors are used to join segments of fiber into longer lengths, to connect fiber to active devices such as radiation sources, detectors and repeaters, and to connect fiber to passive devices such as switches and attenuators. The principal function of an optical fiber connector is to hold a fiber end such that the core of the fiber is axially aligned with the optical path of the component to which the connector is mated (e.g., another fiber, a planar waveguide, or an opto-electric device). This way, light from the fiber is optically coupled to the other component.

It is well known that to effect optical coupling and minimize Fresnel loss, "physical contact" may be made between the fiber end face and the optical path of the mating device. To effect physical contact, traditionally optical connectors have employed a "ferrule," which is a well-known component for holding one or more fibers such that the fiber end faces are presented for optical coupling. Ferrule connectors typically bias the ferrule forward such that, when the connector is mated to a mating component, the ferrule urges against the mating component to physically contact the fiber end face with the optical path of the mating component.

To effect such physical contact, a conventional ferrule typically requires polishing. A polished ferrule may best be described by way of contrast to an unpolished ferrule. An unpolished ferrule has a geometry and anomalies on its end face which make it difficult, if not impossible, to bring the end face of fiber housed therein into physical contact with the optical path of the mating component. In addition, when multiple fibers are affixed to an unpolished ferrule, the position of the fiber end faces tend to vary along the mating axis, thereby making it difficult to effect optical coupling with all of the fibers. Polishing the end face of the ferrule with the fibers held therein, shapes and smoothes the ferrule end face while simultaneously polishing the fiber end faces and making them coplanar. To minimize variances in the shape of the ferrule and the coplanarity of the fiber end faces, polishing typically is performed to exacting standards. Polishing therefore tends to be costly and prone to reworking and waste, thereby lowering yields. The problems associated with polishing the ferrule are exasperated in multi-fiber ferrules which are more complicated to polish.

This issue was addressed in U.S. Pat. No. 7,377,700, which discloses an approach for producing a ferrule assembly using an unpolished assembly. Briefly, the approach involves (a) positioning at least one fiber in a ferrule such that a portion of the fiber extends beyond the end face of the ferrule; (b) affixing the fiber relative to the ferrule; and (c) cleaving the portion of the fiber. Such an approach is beneficial because it separates the functions of preparing the fiber's end face for optical coupling and positioning the fiber within the ferrule. By treating these functions separately, the fiber end face can be prepared independently of the ferrule, thereby eliminating the need to polish the ferrule/fiber assembly, while facilitating the precise positioning of the fiber end face relative to the ferrule. This patent recognizes also that it is generally preferred to have the fiber end face protrude from the ferrule to enhance its ability to make physical contact.

Although this approach offers significant advantages, applicants recognize that coplanarity among the fibers tends to become problematic as the number of fibers in the ferrule increases. That is, cleaving fibers and positioning them in the ferrule such that all the fiber end faces are essentially in the same plane is very difficult when the fibers are not polished in situ in the ferrule. This difficulty increases necessarily as the number of fibers increases. The issue of coplanarity is addressed in United States Patent Application No. 20090271126, incorporated by reference.

Therefore, there was a need for a process of producing a ferrule assembly in which precise fiber protrusion is achieved among the fibers without polishing. This need and others was addressed in U.S. patent application Ser. No. 12/872,315, which discloses a ferrule assembly in which the protrusion of the cleaved fibers is established by using a tool that has a register surface and one or more alignment members that cooperate with one or more alignment members of a ferrule to align the register surface of the tool with the ferrule end face, and thereby provide a register surface against which each fiber can abut to ensure its proper protrusion. Proper fiber protrusion facilitates physical contact among the fibers as described above.

Although the approach in the '315 patent application facilitates good fiber end face coplanarity, it is likely that, at the microscopic level, the fiber ends may not be truly planar or in the same plane as the surface of the ferrule. Accordingly, there is a need for an approach that improves the quality of the mating surface of a connector. The present invention fulfills this need among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides an approach for improving physical contact of a connector by filling around the fiber ends with an optically-clear filler that defines a mating surface. Specifically, rather than attempting to align fiber end faces, which tends to be difficult to do at the microscopic scale, owing to inherent anomalies in the fiber end faces and alignment techniques, the present invention involves encapsulating the fiber ends between the ferrule end face and a register surface. When the register surface is removed, it leaves a smooth mating surface on the filler, regardless of the fibers' protrusion from the ferrule end face.

One aspect of the invention is a process for producing a ferrule by depositing a filler between a ferrule end face and a register surface. In one embodiment, the process comprises: (a) depositing one or more fibers in a ferrule having a ferrule end face such that a portion of each fiber extends forward beyond the ferrule end face; (b) after step (a), positioning a register surface in a predetermined position relative to the ferrule end face; (c) after step (a), depositing an optically-clear filler between the end face and the register surface and around the portion of each fiber; and (d) once the filler solidifies, releasing the register surface form the filler to define a mating surface on the filler.

Another aspect of the invention involves a ferrule assembly having a mating face defined by filler. In one embodiment, the ferrule assembly comprises: (a) a ferrule having a mating face; (b) one or more fibers, a portion of each fiber protruding beyond the mating face; and (c) optically-transparent filler encapsulating the portion of each fiber and defining a smooth mating face a predetermined distance from the ferrule mating face.

Yet another aspect of the invention involves the tool which exploits the alignment members of the ferrule to provide a register against which the fibers can be abutted. In one embodiment, the tool comprises: (a) a wall having a register surface, the wall being essentially transparent to a certain light frequency; and (b) at least one alignment member at a certain angle from the register surface, the alignment member configured to cooperate with a corresponding alignment member of a ferrule.

BRIEF DESCRIPTION OF DRAWINGS

FIGS. 1(a)-1(d) show schematically various stages of preparing a multifiber ferrule assembly according to one embodiment of the present invention.

FIGS. 2(a)-2(d) show schematically different stages of preparing a multifiber ferrule assembly according to another embodiment of the present invention in which different register surfaces are used for aligning the fiber ends and for defining the mating surface.

DETAILED DESCRIPTION

Referring to FIGS. 1(a)-(d), a process for preparing terminated fibers according to one embodiment of the present invention is shown. (Although this description considers a multifiber ferrule in detail, it should be understood that the invention may be practiced on single fiber ferrules as well.) As shown schematically in FIG. 1(a), multiple fibers 101 are positioned in a ferrule 102 having a ferrule end face 103 such that a portion 105 of each of the fibers 101 extends beyond the ferrule end face 103. Next, as shown in FIG. 1(b), some fibers 171 have end faces 106 are registered against a register surface 152. It is possible (and in fact likely, at the microscopic level) that the ends of the fibers may not be planar, and may not be in the same plane as the surface of the ferrule. This is illustrated in FIG. 1(b) by showing two fibers 172, which are not touching the register surface 152. In FIG. 1(c), the gaps between the fiber ends and the register surface are filled using an optically-clear filler 160. Although, in this embodiment, the filler 160 is introduced after the register surface 152 is positioned relative to the ferrule end face 103, the filler may be introduced before the register surface is positioned. After the filler solidifies, the register surface 152 is removed as shown in Fig. (d) to define a smooth mating surface 180. Thus, the filler 160 fills the gaps between the fibers, and also fills the gaps between the tips of the fibers and the register surface 152. For example, as shown in FIG. 1(d), the end faces of fibers 171 are essentially flush with the mating surface 180, and may or may not have filler between their end face and the mating face 180, but fibers 172 protrude less from the ferrule end face and have filler between their end face and the mating face 180. Each of these steps is considered in greater detail below.

The filler 160 may be any known curable optically-transparent or nearly-transparent material capable of flowing around the fiber end faces and against the register surface. Since the distance between the fiber end faces and the mating surface 180 tends to be relatively short, absorption of light by the filler will be minimal in most cases, and thus, the filler need not be totally transparent to light. In one embodiment, the filler has a refractive index the same or substantially the same as the glass fiber. Suitable fillers including, for example, adhesives such as UV-curable epoxy, two-part epoxy, heat-curable epoxy, UV+heat curable epoxy, wax, gel, hot-melt adhesive, thermoset or thermoplastic polymer. As described below, if the filler is UV curable, it may be preferable to use a transparent wall 159 through which UV light may be applied. Conversely, if the wall 159 is opaque, other techniques for curing the filler may be preferred, including, for example, applying UV light from the side (e.g., in the same direction as syringe 190 as shown in FIG. 1(c)), or by using a heat- or anaerobic-curable polymer.

The filler may be applied using known techniques, including, for example, injecting the fluid filler into the space between the register surface and the end face of the ferrule using a syringe 190 or similar device. Capillary action typically serves to draw the filler around the individual fibers. Likewise, surface tension will tend to wet the surface of the register surface and ensure air gaps are eliminated.

In one embodiment, the filler is an adhesive such that it not only functions as filler but also affixes the fibers to the ferrule. In one embodiment, the filler is sufficiently fluid such that it flows into the bore holes of the ferrule through capillary action to enhance the bonding between the fibers and the ferrule.

In one embodiment, the filler is compliant to deform and facilitate contact with a mating surface. Suitable compliant fillers include UV-curable epoxy, two-part epoxy, heat-curable epoxy, UV+heat curable epoxy, wax, gel, hot-melt adhesive, thermoset or thermoplastic polymer.

The step depicted in FIG. 1(a) involves providing ferrule 102 with an end face 103. Although the end face 103 is depicted as a planar surface in FIG. 1(a), it should be understood that a ferrule end face is not necessarily planar and may be instead, for example, curved or domed, or it may have different facets or steps. In one embodiment, the ferrule has one or more pathways (not shown), each pathway being adapted to receive one of the fibers 101. The pathways may be, for example, bore holes or V-grooves. It should be understood, however, that the invention may be practiced with any ferrule having an alignment member, including ferrules that do not have individual pathways for each fiber. For example, the ferrule 102 may be configured to hold ribbon cable or a bundle of fibers collectively.

As mentioned above, a conventional ferrule end face is typically polished, which involves abrading the ferrule end face to remove all anomalies therefrom and to smooth the fiber end faces sufficiently for optical coupling. However, the ferrule of the present invention does not require such polishing since the fiber end faces are suitable for optical coupling following the cleaving step. Therefore, in one embodiment, the ferrule is unpolished.

As used herein, the term "unpolished ferrule" refers to a ferrule that has not been polished or is not polished to the extent typically required to achieve physical contact. An unpolished ferrule in this context has a number of distinguishing characteristics. First, it has a molded surface rather than a polished surface. A molded surface is characterized typically (although not necessarily) by a rough surface, which may not be precisely oriented with respect to the guiding features of the ferrule. Such a surface also tends not to be reflective. The surface of the ferrule may also contain the impression of features that support the core pins used to mold the ferrule, and may include a parting line where two sides of the mold meet. Second, an unpolished ferrule may include embedded particles (e.g. glass particles used for imparting hardness) that lack a planar surface. That is, during polishing, the embedded particles at the end face of the ferrule will have planar surface ground into them at the surface of the end face as the end face is abraded away. Obviously, in an unpolished ferrule, the embedded particles at the end face will not have such a ground planar surface. Third, an unpolished ferrule typically (although not necessarily) has surface anomalies on its end face that tend to interfere with the mating surface of the mating connector or device and prevent end faces of fibers from making physical contact with mating optical pathways. For example, ridges or bumps on the end face of an unpolished ferrule prevent the end face from making good physical contact with a perfectly planar surface. Obviously, as the end face of the ferrule becomes larger in area, as with MT ferrules, the probability of surface variations and imperfections increases along with the number of fibers. Polishing the ferrule removes these surface anomalies. Therefore, as used herein, the term "unpolished ferrule" refers to a ferrule having an end face that has a molded finish and not a polished finish, and/or an end face that has embedded particles which do not have a planar surface.

Although the ferrule may be made from any known material, generally MT ferrules are made of polymeric material, such as highly glass-filled polyphenylene sulfide (PPS). Single-fiber ferrules are typically made of a ceramic such as zirconia or metal such as stainless steel or nickel-silver or titanium.

As shown in FIG. 1(a), the fibers 101 are disposed in the ferrule 102 such that a portion 105 of the fiber extends beyond the ferrule end face 103. In one embodiment, the fibers are cleaved and then disposed in the ferrule. In another embodiment, the fibers are disposed in the ferrule and then cleaved. With respect to the latter embodiment, each fiber should be positioned such that a sufficient portion extends beyond the ferrule end face to facilitate cleaving thereof. The extent to which a fiber extends from the ferrule will depend upon the cleaving techniques used. For example, a mechanical type cleaving method typically requires more space than a laser cleaving approach and, thus, the fiber needs to extend further beyond the ferrule end face to accommodate the mechanism. One skilled in the art will readily understand to what extent the fibers should be extended past the end face of the ferrule to facilitate cleaving thereof.

After the fibers 101 are disposed in the ferrule 102, their protruding portions may be cleaved to form fiber end faces 106. A cleaved fiber end face 106 is suitable for optical coupling—i.e. it is substantially planar and generally free of optical defects such as scratches or chips. Cleaving the fibers may be performed either mechanically or by laser cleaving. With respect to mechanical cleaving, this is a well-known technique and involves essentially shearing the fibers cleanly to provide an end face. It may be preferred to polish a mechanically cleaved end face of the fiber. Methods of performing this polishing are well-known and may include, for example, physical grinding/polishing and "laser polishing" in which a laser is used to melt and thereby smooth the end face of the fiber. Although mechanical cleaving is certainly contemplated in the present invention, the preferred method of cleaving is laser cleaving. Techniques for laser cleaving are known and disclosed for example, in U.S. patent application Ser. No. 12/872,315, incorporated herein by reference.

As shown in FIG. 1(b), the fiber end faces are registered against the register surface 152 of tool 150. This may be accomplished in various ways, including, for example, by pushing the fibers into the register surface 152 or by pushing the register surface 152 into the fibers. In the embodiment shown in FIG. 1(c), the fiber end faces are registered against the register surface 152 by virtue of moving the register surface backward, toward the ferrule end face 103. Specifically, as shown in FIG. 1(a), the register surface 152 is an initial distance away from the ferrule end face 103. As the register surface 152 is pushed toward the ferrule end face as shown in FIG. 1(b), it aligns most of the fiber end faces 106 in the same plane and adjusts the degree of fiber protrusion to the desired distance before the fibers 101 are secured in place. It should be clear that the degree to which the register surface 152 is pushed back depends on the desired degree of fiber protrusion. Because a certain amount of fiber protrusion from the ferrule end face is generally, although not necessarily, desirable, the predetermined distance is generally, although not necessarily, greater than 0. For example, suitable results have been achieved with a predetermined distance of about 1 to about 3.5 μm.

The register surface may be flat/planar or non-planar as disclosed in U.S. application Ser. No. 12/872,315. A non-planar register surface includes, for example, stepped and curved surfaces, and combination thereof. A stepped surface is a surface having edges or steps, and may resemble, for example, a stepped U-shape or stepped V-shape. Conversely, a curved surface is one having a smoothly varying line or surface. Examples of curves include an arc (or more precisely a circular arc), a non-circular arc (or a non-radiused curve), a Gaussian curve, or a parabolic curve. It should also be understood that the profiles discussed herein may apply not only along the rows (x-axis), but also across the rows (y-axis) in the case of a multi-row ferrule. For example, in a three dimension context, curved surfaces include a spherical surface, Gaussian surface, or parabolic surface, just to name a few. Additionally, the curved surfaces may comprise any combination of curves or compound curves. In yet another embodiment, the fiber profile may be described by an even polynomial function of x and y, in which the profile will be symmetric about the center of the ferrule. If the angular tolerances are not symmetric or in the case of a ferrule which has an end face which is not perpendicular to the guide pin axis by design (e.g., an 8 degree end face on a single mode ferrule), it may be advantageous to have a non-symmetric end face profile. This may lead to a desired fiber profile that is expressed as a polynomial with both even and odd terms (with the fiber profile being measured with respect to the angled end face). In another embodiment, the register surface may be configured to profile the fiber end faces such that their coplanarity is greater than 100 nm, with the greatest variation occurring between the inner fibers and the outer fibers.

The geometry of the register surface depends on the application. For example, in the embodiment shown in FIG. 1, the register surface is flat. Such a configuration will align the fiber end faces along a common plane, thus establishing good coplanarity of the fiber ends.

Alternatively, it may be desirable in some applications to use a non-planar register surface to impart a profile to the fibers' protrusion from the ferrule end face. For example, some applications may favor having the outer fibers of the ferrule protrude farther than those on the inside. (See, for example, U.S. patent application Ser. No. 12/872,315.) Such a configuration may improve the physical contact of the fibers toward the periphery of the ferrule as physical contact with these fibers has traditionally more difficult to maintain because the typical polishing process tends to yield fiber protrusions which are shorter for the outer fibers. Accordingly, in one embodiment, the registered surface is a convex surface. The alignment feature is spaced relative to the convex surface such that the apex of the convex surface is positioned in the center of the ferrule end face when the tool is interengaged with the ferrule.

In yet another embodiment, it may be desirable to have the fibers protrude to mate with a mating structure having a non-planar surface. For example, in one embodiment, the fibers may optically couple with a lens which images light onto the end faces of an array of fibers that are arranged along a non-planar surface. In such an embodiment, the register surface will be profiled to match the non-planar surface of the mating structure. Still other profiles are possible within the scope of this invention as disclosed in U.S. application Ser. No. 12/872,315.

In still another embodiment, two different register surfaces are used to align the fibers and to define the mating surface. For example, FIGS. 2(a)-2(d) show schematically different stages of preparing a multifiber ferrule assembly in which different register surfaces are used. In FIG. 2(a), multiple fibers 201 are positioned in a ferrule 202 having a ferrule end face 203 such that a portion 205 of each of the fibers 201 extends beyond the ferrule end face 203. The fiber end faces 206 are registered against a first register surface 252 as shown in FIG. 2(b), thereby establishing a desired fiber protrusion profile.

In FIG. 2(c), a second register surface 262 is positioned relative to the end face 203 of the ferrule. As with the embodiment of FIG. 1, the gaps between the fiber ends and the second register surface are filled using an optically-clear filler 260, and, after the filler solidifies, the second register surface 262 is removed as shown in Fig. (d) to define a smooth mating surface 280. However, unlike the embodiment shown in FIG. 1(c), the second register surface is different form the first register surface. In the particular embodiment shown in FIGS. 2(a)-(d), the first register surface 252 is convex to form a concave fiber profile, while the second register surface 262 is concave to form a convex mating surface 280. Applications for such fiber profiles can vary, although, in one embodiment, the concave profile may be used in the optical interface configuration shown in FIG. 5 of U.S. patent application Ser. No. 12/836,067, herein incorporated by reference. Therefore, in this embodiment, the mating surface is configured independently from the protrusion profile of the fibers. The particular shapes of the first and second register surfaces can be any combination of the planar and non-planar surfaces discussed above. Such independent control of fiber protrusion and mating face shape can be used to produce unique fiber assemblies, having specific optical characteristics. For example, in the embodiment of FIG. 2, the varying thickness of the filler may have a specific function in the optical design.

In one embodiment, in which the filler is a photocurable polymer, the wall 159 defining the register surface 152 is essentially transparent or nearly transparent at the light frequency used for curing. For example, if a UV-curable epoxy is used, then the wall 159 may comprise glass such that UV light can be transmitted through the wall to cure the filler against the register surface 152. In another embodiment, the durability of the register surface may be more important than its ability to transmit light for curing. In such an embodiment, it should comprise a material having suitable toughness and abrasion resistance. Suitable materials include for example, stainless steel, tool steel, Stavax®, and sapphire. Furthermore, the surface may be treated or coated to improve durability.

In one embodiment, the register surface 152 is coated to facilitate release from the filler in step (d). Such coatings are known given the filler composition. For example, a coating of Rain-X® functions well to facilitate removal of the cured adhesive from the register surface. plate.

As disclosed in U.S. patent application Ser. No. 12/872,315 (incorporated herein by reference), to ensure the register surface is oriented properly with respect to the ferrule, the tool 150 may comprises at least one alignment member at a certain angle from the register surface 152. Such an alignment member is configured to cooperate with a corresponding alignment member of the ferrule (not shown). The alignment members may be any known alignment means. For example, the alignment member may be an alignment pin adapted to be received in an alignment hole of the ferrule.

The alignment members of the tool and ferrule interengage to establish a precise relationship between the register surface and the fibers in the ferrule. This relationship may vary according to the application. For example, in the one embodiment, the alignment member on the ferrule is perpendicular to the ferrule end face and parallel to the fibers, as in the case of an MT ferrule. Likewise, the alignment member of the tool is perpendicular to the register surface such that, when the alignment members interengage, the register surface is aligned to be parallel with the ferrule end face and perpendicular to the fibers. Alternatively, the alignment members may be angled with respect to the ferrule end face/register surface, such that the register surface is angled with respect to the ferrule end face when the alignment members are interengaged.

Once the fibers are pushed back to the desired point, they may be affixed by virtue of applying the filler or by applying an additional adhesive in ferrule bore holes. Methods of affixing the fibers are well-known and include, for example, applying adhesive in the ferrule pathways. Other techniques for fixing the fibers position may include, for example, clamping the fiber in an object which is in fixed relation to the ferrule (see, for example, U.S. Pat. No. 6,200,040 which discloses such a clamping mechanism, i.e., the splice element). In one embodiment, a light-curable adhesive is injected in a ferrule window (not shown) before the fibers are pushed back. Then, after they are pushed back into the desired position, the adhesive is cured using a certain wavelength (e.g., UV light). This procedure has the advantage of wetting a substantial length of the fibers by virtue of the fibers moving during the alignment step shown in FIG. 1(b).

The ferrule assembly of the present invention is uniquely suited to facilitate fiber protrusion since the fiber end face and ferrule end face are not polished simultaneously as in the prior art. Polishing a ferrule and fiber assembly together necessarily requires differential wearing of the ferrule and fiber to obtain fiber protrusion. Such differential wearing, however, can be difficult to control, and moreover it does not facilitate varying the protrusion of the fibers across the ferrule. The approach of the present invention, on the other hand, prepares the fiber end face independent from the ferrule end face (in fact, preferably, the ferrule is not even polished). Thus, the fiber end face position and shape with respect to the ferrule end face is fully configurable. For example, in one embodiment, the fibers may optically couple with a lens which images light onto the end faces of an array of fibers that are arranged along a non-planar surface.

Once the ferrule assembly is prepared it may be assembled into an optical package. As used herein, the term "optical package" refers broadly to an assembly comprising a fiber-terminated ferrule assembly and may include, for example, a ferrule-containing connector (e.g., multi-fiber connectors such as the Lightray MPX® connector, MT-RJ connector, and MPO connector, or a ferrule-containing device (e.g., passive devices, such as, add/drop filters, arrayed wave guide gratings (AWGs), splitters/couplers, and attenuators, and active devices, such as, optical amplifiers, transmitters, receivers and transceivers). As is well known, the ferrule assembly in the optical package holds a fiber's end such that the core of the fiber is axially aligned with the optical path of the mating component to which the connector or device is mated. This way, light from the fiber is optically coupled to the other component. The term "optical pathway" as used herein refers to any medium for conducting optical signals, and includes, for example, a fiber or waveguide, a silica or polymeric structure in a substrate, or a silica or polymeric optical component. The term "mating component" refers to an optical package that contains or comprises the optical pathway, and may include, for example, optical connectors and optical devices as mentioned above. A mating component typically comprises a mating surface which is adapted to receive the end face of the ferrule to optically couple the fiber(s) with the mating optical pathway(s). Such mating surfaces are well known in the art.

Optical packages comprising the ferrule assembly of the present invention have a number of advantages over traditional ferrule-containing packages. First, as mentioned above, the ferrule assembly of the present invention obviates the need for polishing. This results in significant simplification of the assembly process and a significant reduction in costs. Aside from this advantage, however, the package of the present invention also has performance related advantages over traditional connectors and packages. Perhaps the most significant performance advantage is derived from the configurability of the fibers' protrusion from the ferrule end face. The protrusion not only allows for the use of an unpolished ferrule, but also facilitates mating with an unpolished ferrule. Thus, the ferrule assembly of the present invention does away with the need for polished ferrules entirely, thereby reducing costs among various optical packages. Furthermore, the fiber's protrusion can even be exploited to compensate for undercut of a polished or unpolished ferrule.

It should be apparent from the above description that the ferrule assembly of the present invention provides for significant advantages over conventional polished ferrule configuration such as lower cost and simplicity in manufacturing and enhanced versatility with respect to the type of mating components with which it can effect optically coupling. Still other advantages of the ferrule assembly are anticipated.

What is claimed is:

1. A process for preparing terminated fibers comprising:
  (a) depositing one or more fibers in a ferrule having a ferrule end face such that a portion of each fiber extends forward beyond said ferrule end face;
  (b) after step (a), positioning a register surface in a predetermined position relative to said ferrule end face;
  (c) after step (a), depositing an optically-clear filler between said end face and a register surface and around said portion of each fiber; and
  (d) once said filler solidifies, releasing said register surface form said filler to define a mating surface on said filler.

2. The process of claim 1, wherein said register surface used in step (b) is the same register surface used in step (c).

3. The process of claim 1, wherein said register surface used in step (b) is a first register surface and said register surface used is step (c) is a second register surface different from said first register surface.

4. The process of claim 1, wherein step (a) comprises cleaving said portion of each fiber, thereby forming cleaved fiber end faces.

5. The process of claim 4, wherein said cleaving is laser cleaving.

6. The process of claim 1, wherein step (b) comprises registering said fiber end faces by moving said register surface backward, thereby pushing said fibers backward until one or more of said fiber end faces abut said register surface and until said register surface is in said predetermined position relative to said ferrule end face.

7. The process of claim 6, wherein said ferrule has at least one first alignment member and said register surface is part of a tool which also comprises a second alignment member, and, in step (b), positioning said register surface comprises interengaging said second alignment member of a tool with said first alignment member such that a register surface of said tool is aligned with said ferrule.

8. The process of claim 7, wherein said ferrule is an MT-type ferrule.

9. The process of claim 7, wherein one of said first or second alignment members is an alignment pin and the other is an alignment hole for receiving said alignment pin.

10. The process of claim 9, wherein said first alignment member is an alignment hole and said second alignment member is an alignment pin.

11. The process of claim 1, wherein said ferrule is a multifiber ferrule.

12. The process of claim 1, wherein said register surface is planar.

13. The process of claim 1, wherein said register surface is non-planar.

14. The process of claim 1, wherein said register surface is at least one of curved, V-shaped, stepped, ellipsoid, intersecting ridges, square stepped pyramid, cylindrical, conical, elongated stepped concentric columns, and curved ridge.

15. The process of claim 1, wherein said ferrule end face is not polished.

16. The process of claim 1, wherein, said optically-clear filler is a UV-curable adhesive.

17. The process of claim 1, wherein step (b) is performed before step (c).

* * * * *